UNITED STATES PATENT OFFICE.

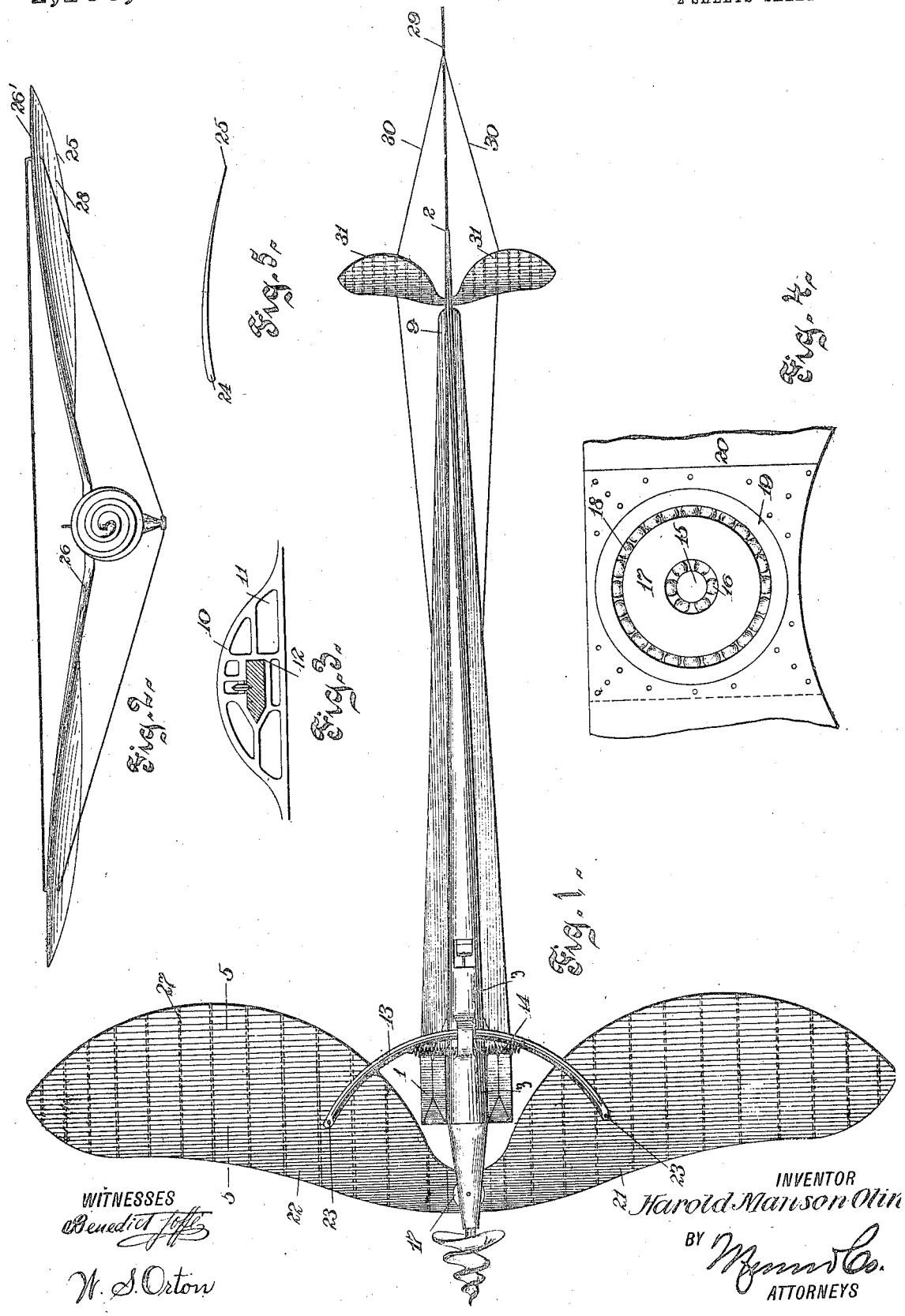

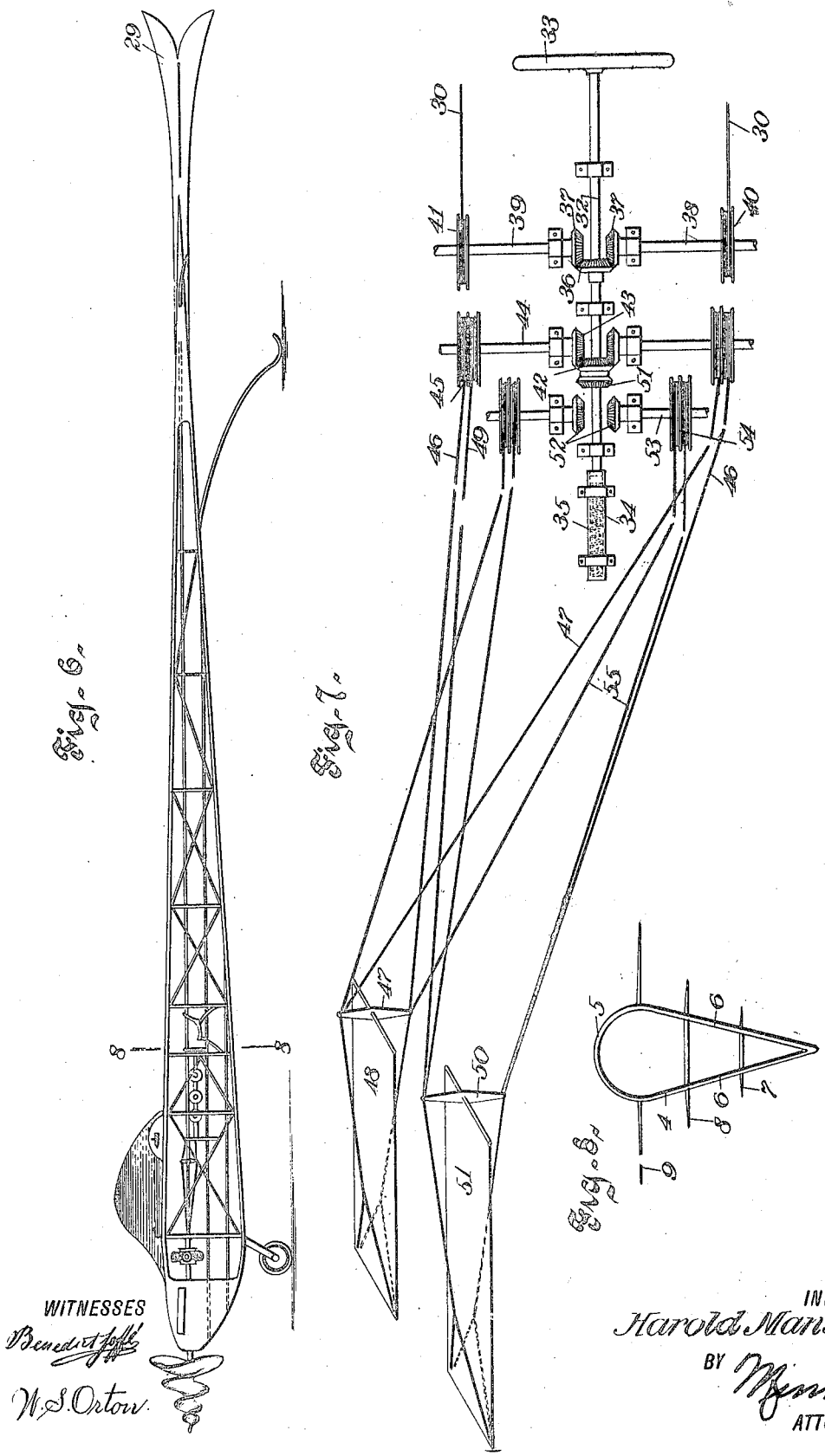

HAROLD MANSON-OLIN, OF NEW YORK, N. Y.

AEROPLANE.

1,103,820.  Specification of Letters Patent.  Patented July 14, 1914.

Application filed July 19, 1911, Serial No. 639,323. Renewed January 14, 1914. Serial No. 812,158.

*To all whom it may concern:*

Be it known that I, HAROLD MANSON-OLIN, a subject of the King of Sweden, and a resident of the city of New York, borough of Brooklyn, in the county of Kings and State of New York, have invented a new and Improved Aeroplane, of which the following is a full, clear, and exact description.
My invention relates to a new and improved form of aeroplanes, and an object of my invention is to provide an aeroplane having rigid supporting surfaces disposed one above the other.
A further object of my invention is to provide an aeroplane having laterally-extending wings maintainable rigidly in a horizontal plane, and capable of rotation in this plane, whereby the device may be automatically stabilized.

A further object of my invention is to provide an aeroplane having automatic stabilizing devices coacting with steering and balancing devices.
With the above and other objects in view, as will more fully hereinafter appear, the present invention consists in certain novel details of construction and arrangement of parts hereinafter fully described, illustrated in the accompanying drawings, and more particularly pointed out in the appended claim.

Reference is to be had to the accompanying drawings, forming a part of this specification, in which similar characters of reference indicate corresponding parts in all the figures, and in which—

Figure 1 is a plan view looking down upon a preferred embodiment of my invention; Fig. 2 is a transverse elevation of the front of my invention; Fig. 3 is a transverse sectional view taken on the line 3—3 of Fig. 1; Fig. 4 is a plan view showing the ball bearing connection between the body and the forward wings; Fig. 5 is a transverse sectional view taken through the wings on the line 5—5 of Fig. 1; Fig. 6 is a side elevation showing the skeleton framework of my machine; Fig. 7 is a perspective view showing the horizontal rudder control; and Fig. 8 is a transverse sectional view taken on the line 8—8 of Fig. 6, showing the disposition of the supporting planes.

The body of my machine is of a general tapering shape from the head rearward, and as shown in Fig. 1, comprises parallel sides 1, 1, which sides, a short distance from the head, are gradually tapered to the rear and meet at a point 2. The body is formed by disposing transversely thereof, a series of substantially triangle-shaped frame members 4 decreasing in size toward the rear of the machine, the upper leg of each of which is curved inward and upward, as shown at 5 in Fig. 8. This skeleton construction is coated with a suitable thin and light sheet metal, preferably steel, fastened to the framework by any suitable means, and presenting a smooth outside surface, thereby to reduce the skin friction.

Disposed upon opposite sides of the legs 6 of each of the members 4, is a series of transversely-disposed planes 7, 8 and 9, one superposed above the other and rigidly fastened to the members 4. The lowest plane, which is the smallest, and the intermediate plane, which is slightly larger in width than the lower plane, are continuous both outside and within the member 4. The upper plane is divided and extends only exteriorly of the member 4. As many of these planes are disposed about the machine as are necessary, and each of said planes is thicker along its inner edge than at its outer edge. This permits of the flexing of the outer portion of each of these planes, thereby preventing undue strain caused by a sudden current of air striking one of the edges of the plane; and, due to the flexibility of these planes, the outer edges will gradually give to any such sudden impulses until the machine has had an opportunity to adjust itself to its new position.

At a point on the machine in a line with the point where the straight and converging sides meet, there is disposed, centrally of the machine and at its uppermost point, a longitudinally-extending bracket 10, preferably recessed, as shown at 11, in order to make the same as light as possible, and having a centrally-disposed aperture 12 in which is slidably mounted an arc-shaped arm 13, normally held in a central position by means of oppositely-disposed springs 14, the outer end of each of which is attached to a part of the arm 13 on opposite sides of the bracket 10, and having the other end of each of said springs attached to said bracket. It will be seen that by this construction the arm 13 is held flexibly in place.

Projecting from the forward end of the machine and having its center at the center of curvature of the arm 13, is a stud 15, rigidly mounted upon the upper part of the machine. Disposed about the stud 15 are ball bearings 16 spacing a washer 17, surrounding which washer 17 are additional ball bearings or other anti-friction devices 18. Encircling the anti-friction devices 18 is a ring 19, which carries the wing construction 20, which wing comprises two parts 21 and 22 extending transversely on opposite sides of the longitudinal center of the machine and held in this position by means of a pin connection 23 positioned through the parts of the wing and through each end of the arm 13. It will be seen by this construction that it is possible to rotate these wings in a horizontal plane against the action of either one of the springs 14, which action is facilitated by means of the anti-friction devices 16, 17 and 18. The wings 21 and 22 are of the general structure shown in plan in Fig. 1, having a relatively thick front edge 24, as shown in Fig. 5, gradually tapering to a thin rear edge 25, the entire wing being curved slightly downward and rearward, as shown in Fig. 5. Viewed in end elevation (Fig. 2), the inner ends of the wings are horizontally-disposed as shown at 26, with their tip ends diverging upward and outward, as shown at 26', the broad portion 27 presenting in effect, a vertical surface 28, due to the downward curvature of the wing, as shown in Fig. 5. The purpose of these movable wings is to aid in securing automatic stability of the device. For instance, the wing on that side receiving an abnormal wind pressure will respond to the pressure which acts against the under surface 28, causes it to be forced rearward to the body, thus reducing the supporting surface on that side, and through the arm 13, forcing the wing on the other side forward, thereby increasing the resistance on that side. As the device responds to this unequal distribution of supporting surface, it will automatically right itself under the tension of the springs 14.

Projecting rearward from the vertical center of the machine, is a flexible vertical fish-tail rudder 29 extending from opposite sides of which are guys 30 leading to a steering device hereinafter described. Positioned just in advance of the rudder 29 and in rear of the ends of the supporting plane 9, is rigidly fastened a pair of wings 31, 31 similar in construction to the wings 21 and 22, but immovably affixed to the body of the machine, and materially smaller than the width of the wings 21 and 22. Preferably these rear wings 31, 31, are of such size that a line passing from the outer tip of either of the wings 21 and 22 and drawn to the end of the horizontal rudder would just touch the outer tips of the rear wings.

In order to steer the device in both a horizontal and a vertical direction, there is disposed in the forward part of the machine, a movable shaft 32 having a hand wheel 33 attached to one end and having the other end disposed in a cylinder 34, which cylinder contains a coil spring 35 bearing on the end of the shaft 32 and tending to force said shaft outward to bring the bevel gear 36 into mesh with the oppositely-disposed bevel gears 37 on the inner ends of shafts 38 and 39, each of which shafts carries a pulley 40 and 41, respectively, upon which is wound one of the guys 30 controlling the rear vertical rudder. When the gear 36 is in contact with the horizontal steering mechanism, the gear 42 is in mesh with the gears 43 on the inner ends of the shafts 44, each of which shafts carries a pair of double-drum pulleys 45, upon which pulleys are wound two sets of guys, one set, 46, leading to the lower arm of a lever 47, which lever has pivoted thereto a horizontal steering plane 48 disposed on the right forward side of the machine. The other guy 49 leads to the upper end of a lever 50 supporting a horizontal plane 51 disposed on the opposite side of the machine to the disposition of the plane 48. By this connection, it is possible to steer the device to the right or left, and, at the same time, to maintain the entire machine in equilibrium. For instance, when a turn to the right is to be made, the steering wheel 30 is turned to the right, causing the shaft 32 and gears 36 and 42 also to turn to the right, thereby shortening one of the guys 30 and lengthening the opposite guy, thereby flexing the rudder or tail 29 to the right. At the same time, the shaft 44 is revolved in the same direction as the shaft 39 winding the guys 46, causing it to raise the left front rudder 48 and to depress the right front rudder. It will be seen that by this arrangement of the guys 46 and 47, all slack is taken up maintaining a rigid connection between these several elements.

When it is desired to raise or lower the machine, the shaft 32 is pressed forward against the action of the spring 35, bringing the gear 51 into mesh with the oppositely-disposed gears 52 positioned on the inner ends of transversely-disposed shafts 53, which shafts each carry a pair of drums 54 similar in arrangement to the drums 45 hereinbefore described. Upon the drums 54 are wound in opposite directions, guys 55 having a connection with the horizontal supporting planes 48 and 51, similar to the connections described for the drums 45. It will be seen that by this disposition of the gearing mechanism, it is possible to simultaneously elevate or depress the horizontal planes 48 and 51, without moving the horizontal steering rudder in the rear.

Many changes could be made in the above construction and many apparently widely different embodiments of this invention could be made without departing from the scope thereof. It is intended that all matters contained herein, in the above description, or shown in the accompanying drawings, shall be interpreted as illustrative and not in a limiting sense. It is also to be understood that the language used in the following claim is merely intended to cover all the generic and specific features of the invention herein described and all statements of the scope of the invention, which, as a matter of language, might be said to fall therebetween, and that materials, sizes and relativities of parts are non-essential, except as called for in the claim.

Having thus described my invention, I claim as new and desire to secure by Letters Patent:

In an aeroplane frame, comprising a series of triangular-shaped frame members decreasing in size from one end of the frame to the other and disposed transversely of the same, a series of transversely-disposed planes, one superposed above the other and rigidly extending outward from each transverse side of the supporting members, each of said planes extending outwardly a greater distance than the plane next below, the lowest of said planes being continuous both outside and within the supporting members.

In testimony whereof I have signed my name to this specification in the presence of two subscribing witnesses.

HAROLD MANSON-OLIN.

Witnesses:
JOSEPH BISHOP,
CHAS. W. H. AKBERG.